Sept. 11, 1962  R. L. FARROW  3,053,565
VEHICLE FOLDING SEAT STRUCTURE
Filed Dec. 29, 1959  2 Sheets-Sheet 1
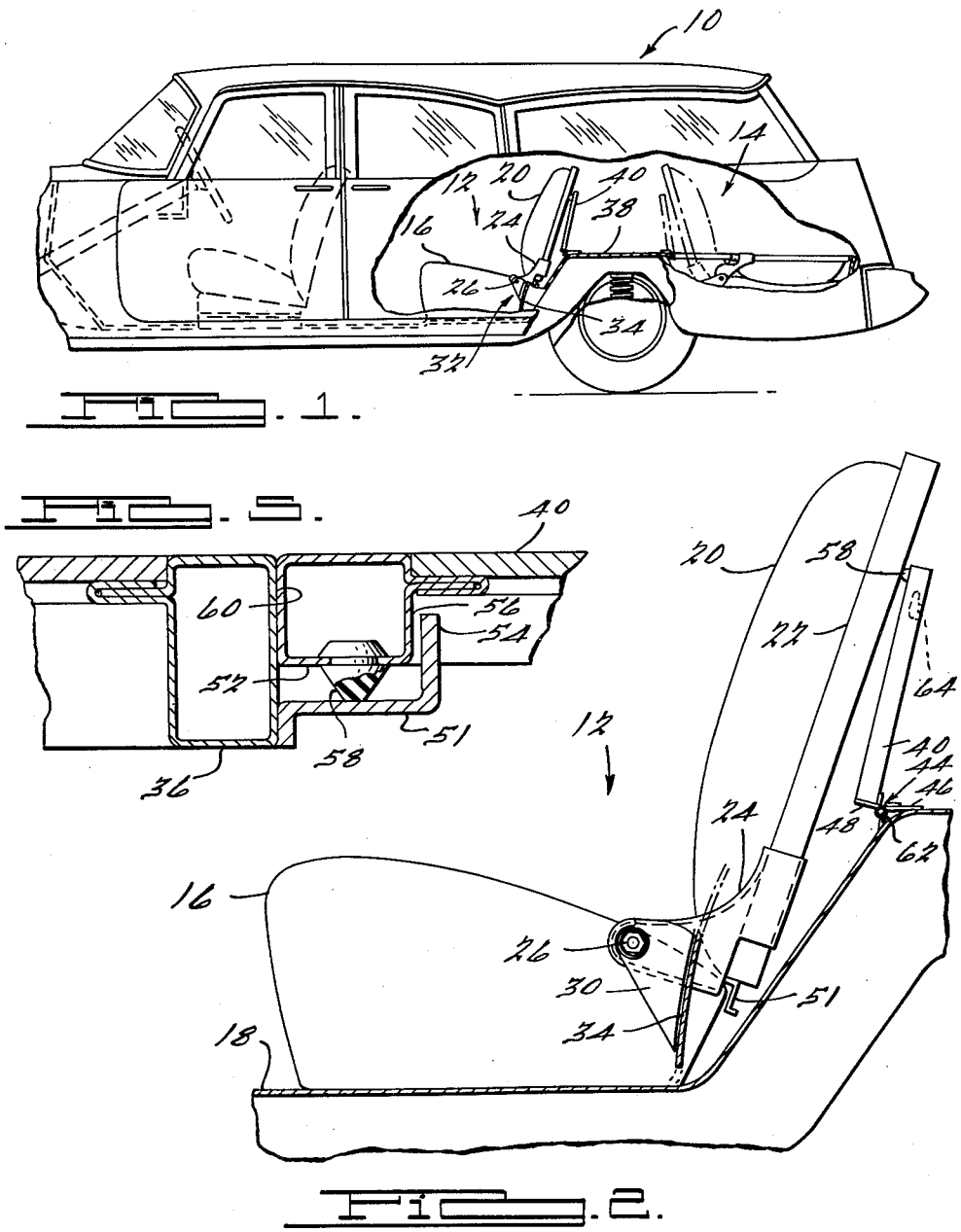
INVENTOR.
Ronald L. Farrow
BY
Harness and Harris
ATTORNEYS.

Sept. 11, 1962 R. L. FARROW 3,053,565
VEHICLE FOLDING SEAT STRUCTURE
Filed Dec. 29, 1959 2 Sheets-Sheet 2
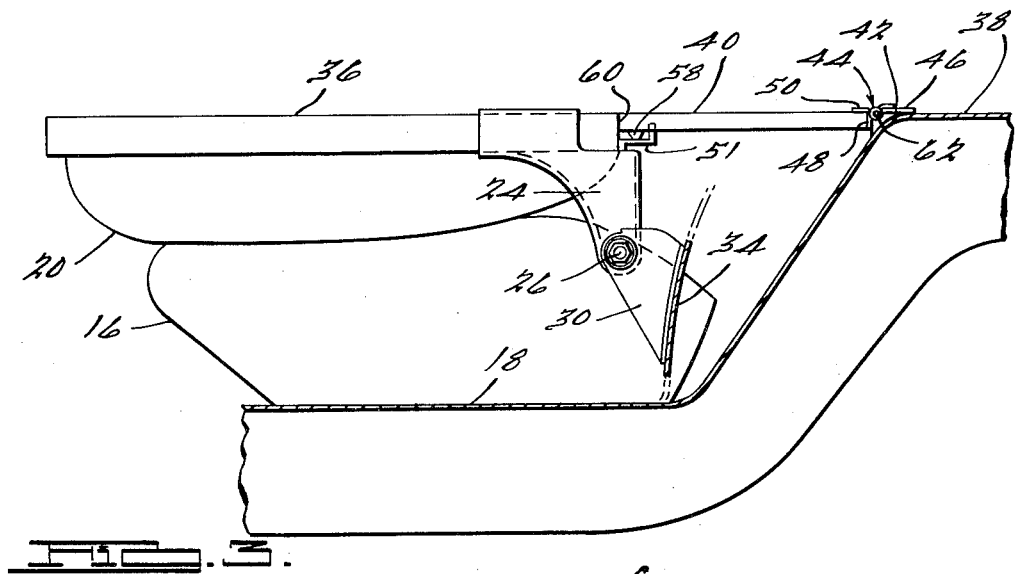
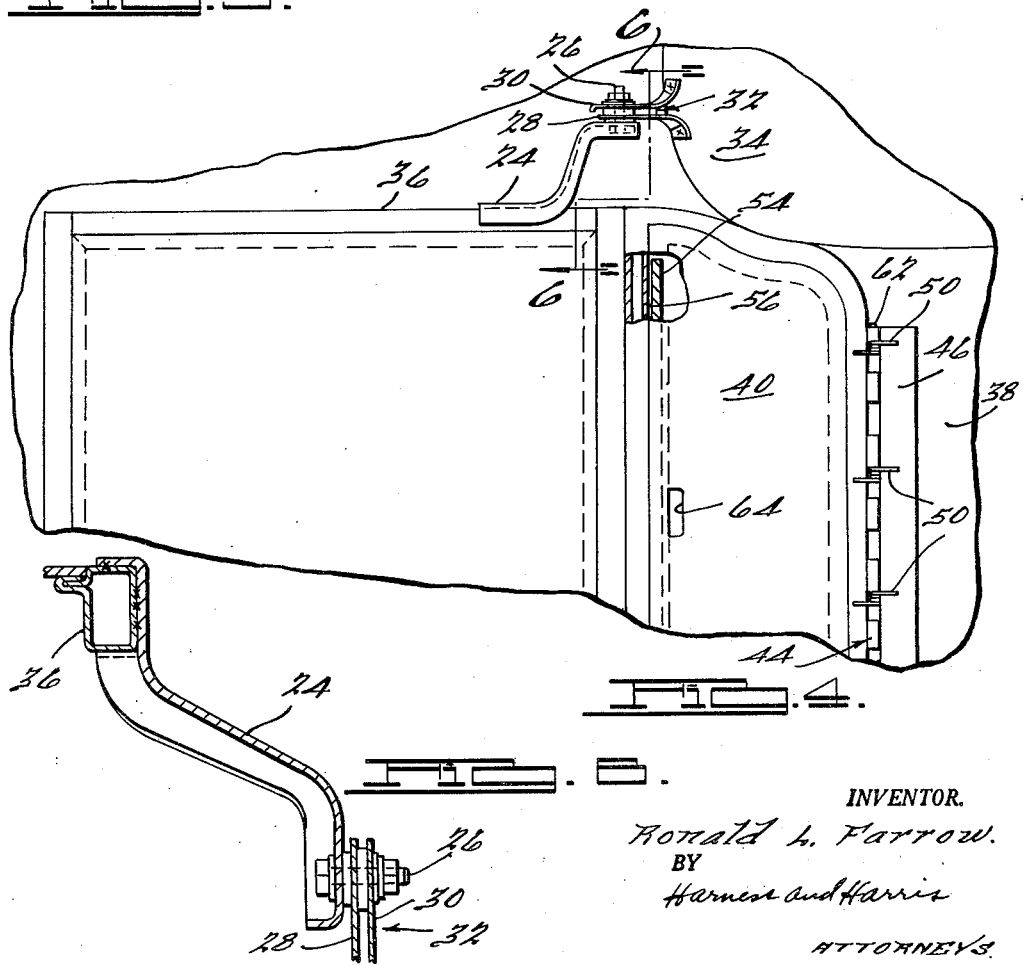
INVENTOR.
Ronald L. Farrow.
BY
Harness and Harris
ATTORNEYS.

United States Patent Office 3,053,565
Patented Sept. 11, 1962

3,053,565
VEHICLE FOLDING SEAT STRUCTURE
Ronald L. Farrow, St. Clair Shores, Mich., assignor to Chrysler Corporation, Highland Park, Mich., a corporation of Delaware
Filed Dec. 29, 1959, Ser. No. 862,510
3 Claims. (Cl. 296—66)

This invention relates to improvements in seating structure and in particular to a Suburban-type vehicle folding seat which is provided with a hatch means to complete the flooring of the vehicle as the back section of the seat is pivoted downwardly to the general plane of the flooring.

Heretofore various types of seating arrangements have been devised to convert the seats into floor sections of the Suburban, but these arrangements have not presented the most simple and most easy to manage convertible seat structure. Moreover, some of these convertible seat arrangements have been provided with additional supporting and mounting structure all of which increases the cost of the seat and increases the complexity of the seat structure and its manner of manipulation.

It is a principal object, therefore, of this invention to provide a vehicle seat which is convertible into a section of the flooring of a vehicle and which is simple in construction and of low cost.

A specific object of this invention is to provide a pivotally mounted back rest and a hatch means pivotally mounted on the vehicle body and adapted to become a section of the flooring of the vehicle as the back rest is itself moved from an upright position to a position wherein it also becomes a section of the vehicle flooring.

A further specific object is to provide this back rest and hatch means with means for maintaining the back rest and the associated hatch means in horizontal compression when they are in their floor positions.

A further object of this invention is to provide means for urging said hatch means about its pivot in the direction of the pivotally mounted backrest.

Further objects and advantages of the present invention will become apparent from the following description and drawings in which:

FIGURE 1 represents a partially broken away side view of a Suburban embodying the present invention;

FIGURE 2 represents an enlarged view of one of the rear seats of the Suburban of FIGURE 1;

FIGURE 3 represents a view of the seat of FIGURE 2 in its cargo carrying position;

FIGURE 4 represents a top elevational view of the seat of FIGURE 3;

FIGURE 5 represents an enlarged view of the retaining structure for the back rest and hatch of the seating structure of FIGURES 1 through 4; and FIGURE 6 represents a view of the back rest mount shown in FIGURE 4 taken along the line 6—6 thereof in the direction of the arrow.

Referring to FIGURE 1 of the drawings, a suburban vehicle designated 10 is provided with a forwardly facing pivotal seat structure 12 and a rearwardly facing seat structure 14 of identical construction but physically reversed in direction. It is obvious that seating structure 14 could be turned around to face in the same direction as that of seating structure 12.

Referring to FIGURE 2, structure 12 comprises a seat pad 16 secured to the floor 18 of the vehicle by any suitable means such as welding, bolts, or adjustable track means should such adjustment of the seat pad 16 be desirable. Structure 12 also comprises a back rest 20 having a frame 22 secured in any suitable manner such as by welding to a bracket 24 shown further in FIGURE 4.

Bracket 24 is pivotally mounted by means of bolt 26 which extends through the bracket 24 and through the upstanding legs 28 and 30 of a support 32 welded or otherwise secured to a body 34 of the vehicle. Each end of the back rest 20 is provided with one of these brackets 24 and supports 32. It is seen from FIGURE 3 that rotation of the back rest 20 counterclockwise about its pivot 26 to a position in which the back portion 36 of the back rest is substantially parallel with the floor section 38 causes back rest 20 to compress the seat pad 16. This compression gives a clockwise rotative force to the back rest 20 for a purpose to be hereinafter explained.

A hatch means 40 is pivotally mounted to the edge 42 of the floor section 38 by means of a hinge 44 comprising an elongated side 46 secured to the floor section 38 by any suitable means, and another elongated section 48 secured to the hatch 40 by any suitable means. Springs 50 are provided on the hinge 44 to urge the hatch 40 about its pivotal axis toward the back portion 36 of the back rest. It is seen, therefore, that as the back rest 36 is pulled or urged in a counterclockwise direction to its overlying position shown in FIGURE 3, the hatch 40 will simultaneously rotate in a counterclockwise direction to also assume the position shown in FIGURE 3.

It is seen from FIGURE 5 that the lower portion of the back rest is provided with a channel-shaped member 51 to receive the free-swinging edge 52 of the hatch 40. The upstanding segment 54 of the member 51 will abut the side 56 of the edge 52 of the hatch to prevent any further significant counterclockwise rotation of the back rest 20. Rubber grommets 58 may be provided on the edge 52 of the hatch to prevent vibrational noise when the hatch is in the position shown in FIGURE 3 and also when the hatch is in the position shown in FIGURE 2.

In the operation of the structure shown, the back rest 20 is manually rotated in a counterclockwise direction about its pivot 26 when it is desired to increase the area of the floor section 38. As the back rest is rotated to the position shown in FIGURE 3, the free swinging edge 52 of the hatch will become engaged in channel 51 and will prevent further rotative movement of the back rest 20 in a counterclockwise direction, and when counterclockwise rotating pressure is removed from back rest 20 it will have a tendency to move in a clockwise direction due to the resiliency of seat pad 16 and thereby compress hatch 40 between the surfaces 60 on the frame 36 and the pin 62 of the hinge 44 to thereby maintain the hatch 40 under compression in its substantially horizontal position. Handle means 64, which may be of the indented type as shown, may be provided in hatch 40 to assist in its removal from the plane of floor section 38 when it is desired to convert the large floor area into the seating arrangement of FIGURE 1.

What is claimed is:

1. In a vehicle body seat structure of the type having a seat cushion and a seat back that is hinge-supported at its lower edge portion on the body so as to be swingable in a forward and downward direction from an upright position where a passenger carrying seat is presented to a horizontal position overlying and compressing the seat cushion wherein a cargo carrying floor portion is presented above the primary floor of the body by the rear face of the seat back, the improvement comprising a panel located immediately behind the seat back and hinge-supported at its lower edge portion on the body so as to be swingable in a forward and downward direction from an upright position corresponding to the upright position of the seat back to a horizontal position where a second cargo carrying floor portion is presented above the primary floor of the body by the rear face of the panel to serve as a rearward continuation for the cargo carrying floor portion of the seat back, antifriction means carried by the upper edge portion of the panel and engaging the rear face of the seat back, a spring means engaging the panel and urging the antifriction means against the rear face of the seat back, and a grooved panel retaining means on the lower edge of the seat back arranged such that the antifriction means will ride down the rear face of the seat back and into the retainer means as the spring means automatically swings down the panel to the horizontal position as the seat back is swung down to the horizontal position, said compressed seat cushion acting to rotate the seat back upwardly and to engage vertically disposed surfaces of the retaining means on the folded seat back with the top end edge of the panel to compress said swung down panel between said retaining means and the panel pivot with the antifriction means latchingly engaged with the grooved panel retaining means.

2. In a vehicle body seat structure of the type having a resilient seat cushion and a seat back that is hinge-supported at its lower edge portion on the body so as to be swingable in a forward and downward direction from an upright position where a passenger carrying seat is presented to a horizontal position overlying and compressing said seat cushion wherein a cargo carrying floor portion is presented above the primary floor of the body by the rear face of the seat back, the improvement comprising a panel located immediately behind the seat back and hinge-supported at its lower edge portion on the body so as to be swingable in a forward and downward direction from an upright position corresponding to the upright position of the seat back to a horizontal position where a second cargo carrying floor portion is presented above the primary floor of the body by the rear face of the panel to serve as a rearward continuation for the cargo carrying floor portion of the seat back, said panel having outwardly projecting latching means along its free upper edge portion, a spring means engaging the panel and urging it against the rear face of the seat back, and a grooved panel retaining means on the lower edge of the seat back arranged to latchingly receive the panel mounted latching means as the spring means automatically swings down the panel to the horizontal position as the seat back is swung down to the horizontal position, said compressed seat cushion acting to rotate the seat back upwardly and to engage vertically disposed surfaces of the retaining means on the folded seat back with the top end edge of the panel to compress said swung down panel between said retaining means and the panel pivot with the latching means latchingly engaged with the grooved panel retaining means.

3. In a vehicle body seat structure of the type having a resilient seat cushion and a seat back that is hinge-supported at its lower edge portion on the body so as to be swingable in a forward and downward direction from an upright position where a passenger carrying seat is presented to a horizontal position overlying and compressing said seat cushion wherein a cargo carrying floor portion is presented above the primary floor of the body by the rear face of the seat back, the improvement comprising a panel located immediately behind the seat back and hinge-supported at its lower edge portion on the body so as to be swingable in a forward and downward direction from an upright position corresponding to the upright position of the seat back to a horizontal position where a second cargo carrying floor portion is presented above the primary floor of the body by the rear face of the panel to serve as a rearward continuation for the cargo carrying floor portion of the seat back, said panel having outwardly projecting latching means along its free upper edge portion, a spring means engaging the panel and urging it against the rear face of the seat back, and a grooved panel retaining means on the lower edge of the seat back arranged to latchingly receive the panel mounted latching means as the spring means automatically swings down the panel to the horizontal position as the seat back is swung down to the horizontal position, said compressed seat cushion acting to rotate the seat back upwardly and to engage vertically disposed surfaces of the retaining means on the folded seat back with the top end edge of the panel to compress said swung down panel between said retaining means and the panel pivot, said interengaged retaining means and latching means being arranged to anchor said seat back against swinging movement in either direction when the seat back has been moved to a substantially horizontal cargo supporting position.

References Cited in the file of this patent
UNITED STATES PATENTS

| | | |
|---|---|---|
| 2,926,948 | Koplin et al. | Mar. 1, 1960 |
| 2,926,950 | Hooverson | Mar. 1, 1960 |
| 2,926,951 | Koplin | Mar. 1, 1960 |
| 2,927,818 | Ferrara | Mar. 8, 1960 |

FOREIGN PATENTS

| | | |
|---|---|---|
| 106,977 | Australia | Mar. 17, 1939 |
| 694,578 | Germany | Aug. 3, 1940 |